United States Patent
Nicholas

(10) Patent No.: US 9,347,004 B2
(45) Date of Patent: May 24, 2016

(54) FLAME PROPAGATION RESISTANT FOAM AND METHOD

(75) Inventor: George F. Nicholas, Marysville, WA (US)

(73) Assignee: THE BOEING COMPANY, Chicago, IL (US)

( * ) Notice: Subject to any disclaimer, the term of this patent is extended or adjusted under 35 U.S.C. 154(b) by 20 days.

(21) Appl. No.: 12/485,648

(22) Filed: Jun. 16, 2009

(65) Prior Publication Data

US 2010/0317756 A1 Dec. 16, 2010

(51) Int. Cl.
*C09K 21/12* (2006.01)
*C08J 9/00* (2006.01)
*C08J 9/40* (2006.01)

(52) U.S. Cl.
CPC .............. *C09K 21/12* (2013.01); *C08J 9/0038* (2013.01); *C08J 9/40* (2013.01); *C08J 2205/05* (2013.01)

(58) Field of Classification Search
CPC .......... C09K 21/12; C08J 9/40; C08J 9/0038; C08J 2205/05
USPC ............. 521/55, 57, 85, 136, 187; 428/308.4, 428/319.3
See application file for complete search history.

(56) References Cited

U.S. PATENT DOCUMENTS

| | | | |
|---|---|---|---|
| 4,224,374 A | | 9/1980 | Priest |
| 4,885,206 A | * | 12/1989 | Graalmann et al. ....... 428/316.6 |
| 5,047,436 A | * | 9/1991 | Hill et al. ....................... 521/53 |
| 6,231,794 B1 | * | 5/2001 | Woldanski ................... 264/45.3 |
| 6,350,511 B2 | * | 2/2002 | Thom ......................... 428/308.4 |
| 6,512,133 B1 | | 1/2003 | Götzmann et al. |
| 7,040,575 B2 | | 5/2006 | Struve et al. |
| 7,052,630 B2 | * | 5/2006 | Yang et al. ..................... 252/609 |
| 2003/0216484 A1 | * | 11/2003 | Phillips et al. .................. 521/50 |
| 2005/0177950 A1 | | 8/2005 | Niederoest et al. |
| 2006/0194893 A1 | | 8/2006 | Prybutok |
| 2007/0259980 A1 | | 11/2007 | Park |
| 2008/0197524 A1 | * | 8/2008 | Baumgartl et al. ............. 264/54 |
| 2009/0032640 A1 | | 2/2009 | Moores et al. |
| 2009/0118384 A1 | | 5/2009 | Nicholas |

FOREIGN PATENT DOCUMENTS

| | | |
|---|---|---|
| DE | 10011388 | 11/2000 |
| EP | 1095945 | 5/2001 |
| GB | 1359734 | 7/1974 |

OTHER PUBLICATIONS

PCT, International Search Report and Written Opinion, International Application No. PCT/US2010/033899; 14 pages (Aug. 13, 2010).
Jones, R.G., "Reactions of Polymers, 1.4 curing," Compendium of Polymer Terminology and Nomenclature: IUPAC Recommendations, 2008, International Union of Pure and Applied Chemistry, Commission on Macromolecular Nomenclature, p. 239.
Kowalski, S.J., excerpt from "Preface," Thermomechanics of Drying Processes, Lecture Notes in Applied and Computational Mechanics, vol. 8 (2003).
EP, Examination Report, European Application No. 10719500.0, dated Feb. 11, 2016.

* cited by examiner

*Primary Examiner* — John Cooney
(74) *Attorney, Agent, or Firm* — Thompson Hine LLP

(57) ABSTRACT

A method for making a flame propagation resistant foam from a foam substrate including the steps of preparing a flame-retardant solution that includes an organic phosphate ester in water, immersing the foam substrate in the flame-retardant solution to obtain a partially treated foam substrate and curing the partially treated foam substrate at a predetermined temperature for a predetermined amount of time.

14 Claims, 1 Drawing Sheet

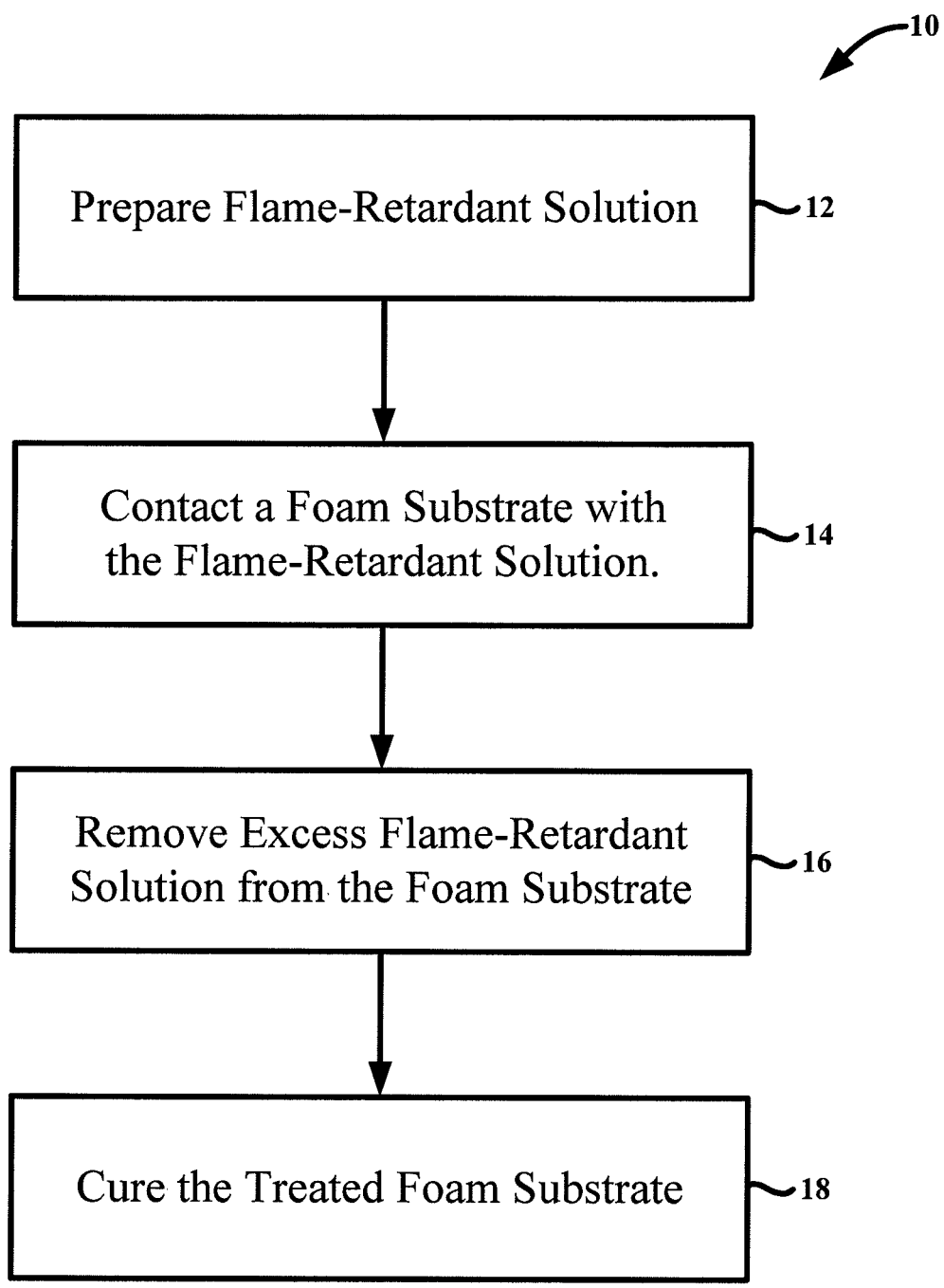

FLAME PROPAGATION RESISTANT FOAM AND METHOD

FIELD

The present patent application relates to foams having improved resistance to radiant panel flame propagation and, more particularly, to flame propagation resistant thermal and acoustic foams.

BACKGROUND

Open cell foams, such as melamine resin foams, are lightweight and have thermal and acoustic properties that render such foams attractive as insulation materials in commercial aircraft applications. Furthermore, open cell foam insulation materials may be easier to install than traditional fiberglass insulation materials and, therefore, may potentially reduce overall manufacturing costs.

However, thermal and acoustic insulation materials used in commercial aircraft applications are subject to governmental regulations regarding flammability. In particular, various government regulations require testing for radiant panel flammability, vertical burn, combustion toxic gas generation and combustion smoke generation. For example, the radiant panel test requires that insulation materials, alone or, more typically, covered in protective films, be subjected to a directed on surface propane pilot flame for 15 seconds, while being under an intense radiant heat source that measures 1.7 Watts/cm$^2$ at the zero point. Under these conditions, the insulation material must resist propagating a flame greater than 2 inches, nearly an inch of which typically occurs as an artifact of the flame's initial strike on the surface. In addition, any after-flame on the material must self-extinguish within 3 seconds.

As will be appreciated by those skilled in the art, passing such stringent flammability tests on a consistent, long term basis has proven difficult for typical foam insulation materials. Therefore, aircraft manufacturers have continued to use traditional mineral-based insulation materials.

Nonetheless, those skilled in the art continue to seek materials, including foam materials, capable of meeting rigorous flammability requirements.

SUMMARY

In one aspect, the disclosed flame propagation resistant foam may include a foam substrate that was contacted with a flame-retardant solution that includes an organic phosphate ester in water, wherein, after contacting, the foam substrate was cured at a predetermined temperature for a predetermined amount of time.

In another aspect, the disclosed method for making a flame propagation resistant foam from a foam substrate may include the steps of preparing a flame-retardant solution that includes an organic phosphate ester in water, contacting the foam substrate with the flame-retardant solution to obtain a partially treated foam substrate and curing the partially treated foam substrate at a predetermined temperature for a predetermined amount of time.

In another aspect, the disclosed flame propagation resistant foam may include a melamine resin foam substrate that was contacted with a flame-retardant solution including an organic phosphate ester in an aqueous carrier, wherein the organic phosphate ester comprises about 0.1 to about 2 percent by weight of the flame-retardant solution, and wherein the melamine resin foam substrate was mechanically deformed while in contact with the flame-retardant solution, and wherein, after contacting, the foam substrate was cured at a predetermined temperature for a predetermined amount of time.

In yet another aspect, the disclosed method for making a flame propagation resistant foam from a melamine resin foam substrate may include the steps of preparing a flame-retardant solution including an organic phosphate ester in an aqueous carrier, wherein the organic phosphate ester comprises about 0.1 to about 2 percent by weight of the flame-retardant solution, contacting the melamine resin foam substrate with the flame-retardant solution, during the contacting step, mechanically deforming the melamine resin foam substrate and, after the contacting step, curing the melamine resin foam substrate at a predetermined temperature for a predetermined amount of time.

Other aspects of the disclosed flame propagation resistant foam and method will become apparent from the following description, the accompanying drawings and the appended claims.

BRIEF DESCRIPTION OF THE DRAWING

FIG. 1 is a flow chart illustrating one aspect of the disclosed method for making a flame propagation resistant foam.

DETAILED DESCRIPTION

Referring to FIG. 1, one aspect of the disclosed method for making a flame propagation resistant foam, generally designated 10, may begin by preparing a flame-retardant solution, as shown at block 12. Then, as shown at block 14, a foam substrate may be contacted with the flame-retardant solution. After removing excess flame-retardant solution from the foam substrate (block 16), the treated foam substrate may be cured, as shown at block 18. The steps shown in blocks 14 and 16 may be repeated one or more times to increase the penetration of the flame-retardant solution into the foam substrate.

The foam substrate may be any open cell foam material. In one particular aspect, the foam substrate may be a low density open cell polymeric resin foam. For example, the foam substrate may be BASOTECT® melamine resin foam available from BASF Aktiengesellschaft of Ledwigshafen am Rhein, Germany.

In one aspect, the foam substrate may be provided as a panel and may have a panel thickness. For example, the panel thickness may range from about 1 to about 3 inches. Of course, lesser or greater thicknesses may be used without departing from the scope of the present disclosure. In another aspect, the foam substrate may be provided as a block, wherein the block may be dimensioned to accommodate a specific application.

The flame-retardant solution may be an aqueous solution comprising one or more organic phosphate esters in an aqueous carrier (e.g., water). It is believed that organic phosphate esters impart the disclosed flame-retardant solution with flame-retardant properties, as is discussed herein. Optionally, in addition to organic phosphate esters, the flame-retardant solution may additionally include other flame-retardant components. An example of another flame-retardant component useful in the disclosed flame-retardant solution is an inorganic flame retardant, such as aluminum hydroxide.

The organic phosphate ester component of the disclosed flame-retardant solution may be a single organic phosphate ester or a blend of organic phosphate esters. In one aspect, the organic phosphate ester component of the disclosed flame-retardant solution may include one or more alkyl-substituted phosphate esters. In another aspect, the organic phosphate ester component of the disclosed flame-retardant solution may include multiple alkyl-substituted phosphate esters, wherein at least two of the alkyl-substituted phosphate esters have substantially different boiling or vapor points. For example, at least two of the alkyl-substituted phosphate esters in the disclosed flame-retardant solution may have a difference in boiling points of about 10° C.

The organic phosphate ester component of the disclosed flame-retardant solution may be obtained from commercially available flame retardants typically used in the textile industry. In one example, the organic phosphate ester component may be obtained using PYROZYL M73 available from American Manufacturing International, Inc. (Amitech) or Paterson, N.J. In another example, the organic phosphate ester component may be obtained using SPARTAN AR 295 available from Spartan Flame Retardants, Inc. of Crystal Lake, Ill., which is a blend of organic and inorganic components. In yet another example, the organic phosphate ester component may be obtained using FLAMEPROOF #1528 available from Apexical, Inc. of Spartanburg, S.C.

In one aspect, the organic phosphate ester (or esters) in the disclosed flame-retardant solution may comprise about 0.01 to about 15 percent by weight of the flame-retardant solution. In another aspect, the organic phosphate ester (or esters) in the disclosed flame-retardant solution may comprise about 0.1 to about 5 percent by weight of the flame-retardant solution. In yet another aspect, the organic phosphate ester (or esters) in the disclosed flame-retardant solution may comprise about 0.1 to about 2 percent by weight of the flame-retardant solution. At this point, those skilled in the art will appreciate that the amount of the organic phosphate ester (or esters) in the disclosed flame-retardant solution may depend upon the type of organic phosphate esters used and the type of foam substrate used, among other factors.

One exemplary flame-retardant solution may be prepared by mixing 300 milliliters of PYROZYL M73 with 29.7 liters of distilled water.

At this point, those skilled in the art will appreciate that one or more additional functional additives may be included in the disclosed flame-retardant solution without departing from the scope of the present disclosure. Exemplary additional functional additives include hydrophobants (e.g., aqueous siloxane emulsions), oleophobants (e.g., perfluoroacrylate copolymer emulsions) and formaldehyde scavengers (e.g., SUMITEX BUFFER FW, available from Sumitomo Chemical Co., Ltd. of Tokyo, Japan), as well as auxiliaries such as sequestrants, buffers, levelers, dispersants and biocides.

In an alternative aspect, the disclosed flame-retardant solution may be substantially free of brominated compounds and heavy metals.

Referring again to block 14, the foam substrate may be contacted with the disclosed flame-retardant solution such that the flame-retardant solution impregnates the foam substrate (i.e., the flame-retardant solution penetrates the surface of the foam substrate and transfers into the internal cross-section). In one aspect, the flame-retardant solution may be received in a vessel, such as a tank, and the foam substrate may be immersed into the flame-retardant solution in the vessel (e.g., by dipping).

At this point, those skilled in the art will appreciate that the foam substrate may be in contact with the flame-retardant solution for a time sufficient to achieve the desired penetration and distribution of the solution into the foam. Furthermore, the temperature of the flame-retardant solution may be controlled to optimize penetration and distribution of the solution into the foam.

Optionally, the foam substrate may be mechanically deformed while in contact with the flame-retardant solution to improve penetration of the solution into the foam. One exemplary technique for mechanically deforming the foam substrate includes repeatedly compressing and relaxing the foam substrate. Another exemplary technique for mechanically deforming the foam substrate includes kneading the foam substrate.

Referring to block 16, after contacting the foam substrate with the flame-retardant solution, excess solution may be removed from the foam substrate. For example, about 90 percent of the absorbed flame-retardant solution may be removed. In one aspect, the treated foam substrate may be allowed to drip dry before proceeding to the curing step. In another aspect, the treated foam substrate may be squeezed to remove excess solution. For example, squeezing may be accomplished by passing the treated foam substrate through a nip defined by two rollers.

Optionally, after removing excess flame-retardant solution, the foam substrate may again be contacted with the flame-retardant solution, after which excess solution may be removed as discussed above. The steps shown in blocks 14 and 16 may be repeated several time to achieve the desired penetration and distribution of the flame-retardant solution in the foam substrate. For example, the steps shown in blocks 14 and 16 may be performed once for every inch of thickness of the foam substrate.

Finally, referring to block 18, the treated foam substrate may be cured. The step of curing the treated foam substrate may include maintaining the treated foam substrate at a predetermined temperature for a predetermined amount of time. Those skilled in the art will appreciate that the curing step may be performed in an oven (e.g., a batch oven or a conveyor oven) to facilitate maintaining the desired temperature. The curing oven may include a forced air feature.

In one particular aspect, the curing step may be performed in multiple phases, wherein each phase includes a specific temperature and a specific treatment time. For example, the treated foam substrate may be subjected to an initial cure at about 120° C. for about 2 hours, followed by a final cure at about 150° C. for about 30 minutes.

Accordingly, the disclosed flame propagation resistant foam may have the desired flammability characteristics, while retaining most or all of the original foam properties, including flexibility and lightweight.

Although various aspects of the disclosed flame propagation resistant foam and method have been shown and described, modifications may occur to those skilled in the art upon reading the specification. The present application includes such modifications and is limited only by the scope of the claims.

What is claimed is:

1. A method for making a flame propagation resistant foam from a foam substrate comprising the steps of:
    preparing a flame-retardant solution comprising an alkyl-substituted organic phosphate ester in an aqueous carrier and comprising a hydrophobant, and one or more of an oleophobant and a formaldehyde scavenger;
    contacting said foam substrate with said flame-retardant solution;
    drying said foam substrate; and
    after said drying step, curing said foam substrate, wherein curing includes subjecting the foam substrate to a temperature in excess of about 150° C. for at least 30 minutes.

2. The method of claim 1 wherein said foam substrate is an open cell polymeric resin foam substrate as a panel having a thickness of about 1 to about 3 inches.

3. The method of claim 1 wherein said foam substrate includes a melamine resin foam.

4. The method of claim 1 wherein said flame-retardant solution further comprises an inorganic flame retardant.

5. The method of claim 4 wherein said inorganic flame retardant includes aluminum hydroxide.

6. The method of claim 1 wherein said organic phosphate ester comprises about 0.1 to about 5 percent by weight of said flame-retardant solution.

7. The method of claim 1 wherein said organic phosphate ester comprises about 0.1 to about 2 percent by weight of said flame-retardant solution.

8. The method of claim 1 wherein said contacting step includes immersing said foam substrate in a bath of said flame-retardant solution.

9. The method of claim 1 further comprising the step of mechanically deforming said foam substrate while said contacting step is being performed.

10. The method of claim 1 wherein, subsequent to contacting said foam substrate with said flame-retardant solution and prior to curing, removing about 90 percent of said flame-retardant solution absorbed by said foam substrate by squeezing said foam substrate to expel said flame-retardant solution therefrom or by drying said foam substrate.

11. The method of claim 10 wherein said contacting step is repeated after said removing step.

12. A method for making a flame propagation resistant foam from a melamine resin foam substrate comprising the steps of:
    preparing a flame-retardant solution comprising an alkyl-substituted organic phosphate ester in an aqueous carrier and comprising a hydrophobant, and one or more of an oleophobant and a formaldehyde scavenger, wherein said organic phosphate ester comprises about 0.1 to about 2 percent by weight of said flame-retardant solution;
    immersing said melamine resin foam substrate a bath of said flame-retardant solution;
    during said immersing step, mechanically deforming said melamine resin foam substrate; and
    after said immersing step, curing said melamine resin foam substrate at a temperature in excess of about 100° C. for at least about 2 hours.

13. The method of claim 1, wherein the hydrophobant is present and comprises an aqueous siloxanes emulsion.

14. A method for making a flame propagation resistant foam from a foam substrate comprising the steps of:
    preparing a flame-retardant solution comprising an alkyl-substituted organic phosphate ester in an aqueous carrier and comprising at least one of a hydrophobant, an oleophobant and a formaldehyde scavenger;
    contacting said foam substrate with said flame-retardant solution;
    drying said foam substrate; and
    after said drying step, curing said foam substrate, wherein curing includes subjecting the foam substrate to a temperature in excess of about 150° C. for at least 30 minutes;
    wherein the alkyl-substituted organic phosphate ester comprises a plurality of alkyl-substituted organic phosphate esters, wherein at least two of the plurality of alkyl-substituted organic phosphate esters have a difference in boiling points of about 10° C.

\* \* \* \* \*